US012333130B2

(12) United States Patent
Zummo

(10) Patent No.: US 12,333,130 B2
(45) Date of Patent: Jun. 17, 2025

(54) SYSTEMS AND METHODS FOR VISUALLY INDICATING VALUE CHANGES IN A BUILDING MANAGEMENT SYSTEM

(71) Applicant: Johnson Controls Technology Company, Plymouth, MI (US)

(72) Inventor: Michael J. Zummo, Milwaukee, WI (US)

(73) Assignee: Tyco Fire & Security GmbH, Neuhausen am Rheinfall (CH)

( * ) Notice: Subject to any disclaimer, the term of this patent is extended or adjusted under 35 U.S.C. 154(b) by 460 days.

(21) Appl. No.: 15/258,854

(22) Filed: Sep. 7, 2016

(65) Prior Publication Data
US 2018/0067635 A1 Mar. 8, 2018

(51) Int. Cl.
*G06F 17/00* (2019.01)
*F24F 11/30* (2018.01)
*F24F 11/62* (2018.01)
*G06F 3/04847* (2022.01)
*H04L 12/28* (2006.01)

(52) U.S. Cl.
CPC .......... *G06F 3/04847* (2013.01); *F24F 11/30* (2018.01); *F24F 11/62* (2018.01); *H04L 12/2823* (2013.01)

(58) Field of Classification Search
CPC .... G06F 3/04847; G06F 3/048; G06F 3/0484; G06Q 40/06
USPC ................. 715/739, 854, 701, 771
See application file for complete search history.

(56) References Cited

U.S. PATENT DOCUMENTS

| | | | |
|---|---|---|---|
| 6,704,012 B1* | 3/2004 | Lefave | G06F 11/323 345/440 |
| 7,130,719 B2* | 10/2006 | Ehlers | H04L 67/12 700/276 |
| 7,965,178 B1* | 6/2011 | Schmuttor | G07C 9/20 340/521 |
| 8,364,519 B1* | 1/2013 | Basu | G06Q 10/06393 705/7.38 |
| 9,459,755 B2* | 10/2016 | Curtis | G06F 3/0481 |
| 9,494,952 B2* | 11/2016 | Storm | G05D 23/1905 |
| 9,535,411 B2* | 1/2017 | Wei | G05B 19/02 |
| 9,651,924 B2* | 5/2017 | Brun | H04L 12/2803 |
| 10,127,504 B2* | 11/2018 | El-Mankabady | G06Q 10/0631 |
| 10,430,038 B2* | 10/2019 | Williams | G06T 11/206 |
| 2007/0033129 A1* | 2/2007 | Coates | G06Q 40/06 705/36 R |
| 2008/0209342 A1* | 8/2008 | Taylor | G05B 15/02 715/747 |

(Continued)

*Primary Examiner* — Adam M Queler
*Assistant Examiner* — Matthew J Ludwig
(74) *Attorney, Agent, or Firm* — Foley & Lardner LLP

(57) ABSTRACT

A building management system monitoring device include a processing circuit. The processing circuit includes a processor and a memory and is configured to receive data from the building management system. The device further includes a data evaluation module stored in the memory and configured to evaluate the received data. The monitoring device further including a user interface. The user interface is in communication with the processing circuit, and configured to display a plurality of real-time data values received by the processing circuit. The user interface is further configured to display a visual indication in response to the data evaluation module determining a data value variation exceeds a predetermined threshold.

20 Claims, 11 Drawing Sheets

(56) References Cited

U.S. PATENT DOCUMENTS

| | | | |
|---|---|---|---|
| 2008/0235075 A1* | 9/2008 | Couture | G06F 11/3495 709/224 |
| 2009/0222763 A1* | 9/2009 | Dukhon | G06F 3/04845 715/808 |
| 2010/0306709 A1* | 12/2010 | Lynch | G06F 17/30516 715/854 |
| 2011/0007443 A1* | 1/2011 | Crookham | H02H 3/347 361/93.2 |
| 2011/0087988 A1* | 4/2011 | Ray | G06Q 10/06 715/771 |
| 2011/0153103 A1* | 6/2011 | Brown | G06Q 10/04 700/291 |
| 2012/0240072 A1* | 9/2012 | Altamura | G06T 11/206 715/771 |
| 2015/0088312 A1* | 3/2015 | Lo | G05B 15/02 700/275 |
| 2015/0212714 A1* | 7/2015 | Hua | G06F 3/04847 715/739 |
| 2016/0011573 A1* | 1/2016 | Marti | G05B 15/02 700/9 |
| 2017/0212668 A1* | 7/2017 | Shah | G06F 3/04847 |
| 2017/0300844 A1* | 10/2017 | Urry | G06Q 10/06313 |
| 2017/0329292 A1* | 11/2017 | Piaskowski | G05B 15/02 |
| 2017/0364046 A1* | 12/2017 | Westrick, Jr. | H05B 47/18 |
| 2018/0067635 A1* | 3/2018 | Zummo | H04L 12/2823 |

\* cited by examiner

First Floor MASP

Complete System View ▶  | Actions | Configure | Simulate | Commission | List View | Diagram View

Inputs

Network Inputs
APP-MODE
   Auto
GL-EN
   True
DAP-SP
   1.00 in wc
DAT-SP
   55.0 deg F
Mike's SLP-SP
   1.00 in wc
OAD-MINPOS
   10.0%
OCC-OVERRIDE
   Not Set Inputs
SF-S
   Off
   HW: Service not available
TEF-S
   Off
   HW: Service not available

Control Logic

Set Points / Miscellaneous
Unocc Heating Fan Lockout
   Normal
Unocc Cooling Fan Lockout
   Normal
TEF Interlock
   FALSE
Occupancy Mode Determination
   Occupied State Generation
Water System Flush Pass Trough
   False
Smoke Control Sequencing for UL-864
   Normal
PID Turning Reset
   False
Supply Fan Alarms
   Normal
TEF Alarms
   Alarm
Supply Fan Override Check
   False

▶

Outputs

Network Output
CLG-O
   0.0%
   HW: Service not available  ← 702

CLG-O
   0.0%
   HW: Service not available

Miscellaneous
MAD-O
   0.0%
   HW: Service not available

■ Simulating at 1x time dd:hh:mm:ss     Add Break Point     View Break Point    ∧

FIG. 7

First Floor MASP

Complete System View ▶ | Configure | Simulate | Commission | List View | Diagram View

Actions

Inputs

Network Inputs
APP-MODE
  Auto
GL-EN
  True
DAP-SP
  1.00 in wc
DAT-SP
  55.0 deg F
Mike's SLP-SP
  1.00 in wc
OAD-MINPOS
  10.0%
OCC-OVERRIDE
  Not Set Inputs
SF-S
  Off
  HW: Service not available
TEF-S
  Off
  HW: Service not available

Control Logic

Set Points / Miscellaneous
Unocc Heating Fan Lockout
  Normal
Unocc Cooling Fan Lockout
  Normal
TEF Interlock
  FALSE
Occupancy Mode Determination
  Occupied State Generation
Water System Flush Pass Trough
  False
Smoke Control Sequencing for UL-864
  Normal
PID Turning Reset
  False
Supply Fan Alarms
  Normal
TEF Alarms
  Alarm
Supply Fan Override Check
  False

▶

Outputs

Network Output
CLG-O
  0.0%
  HW: Service not available ← 802

CLG-O
  0.0%
  HW: Service not available

Miscellaneous
MAD-O
  0.0%
  HW: Service not available

■ Simulating at 1x time dd:hh:mm:ss | Add Break Point | View Break Point ⌃

FIG. 8

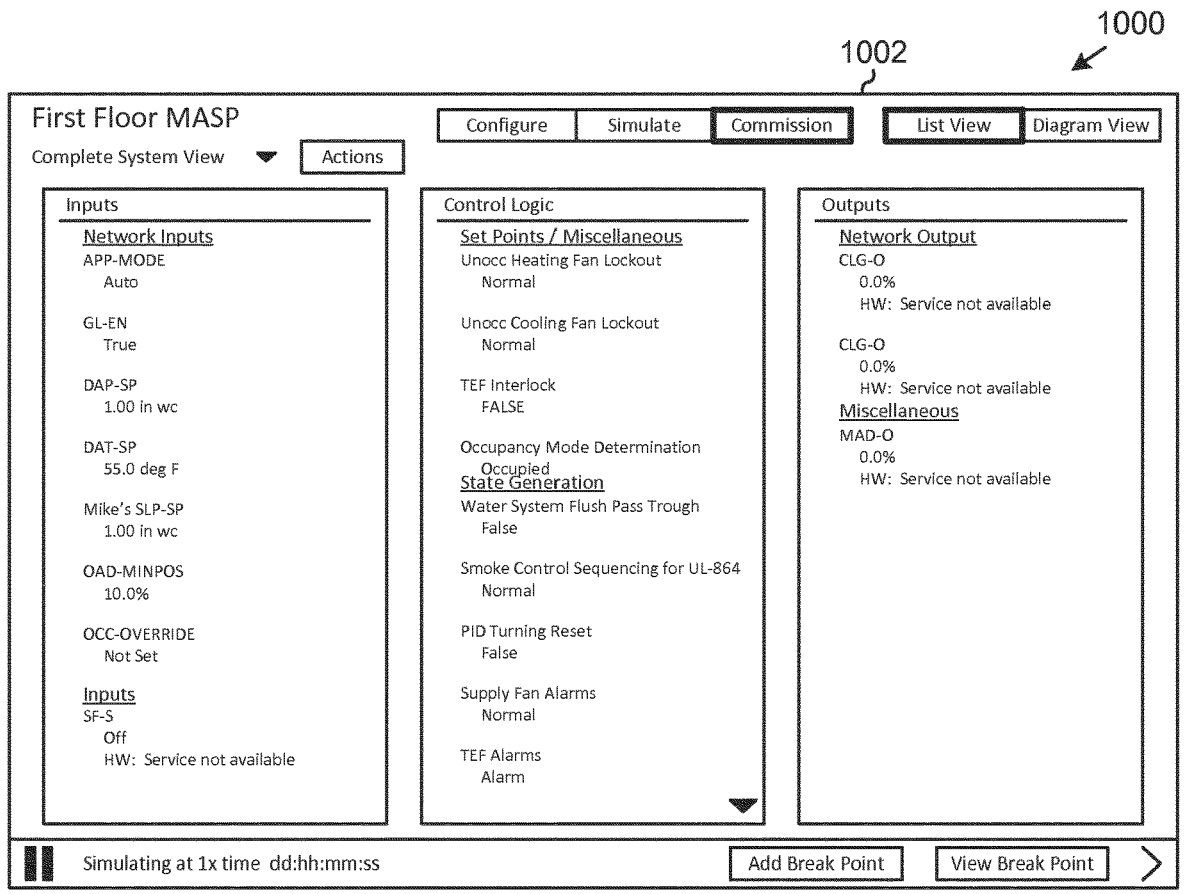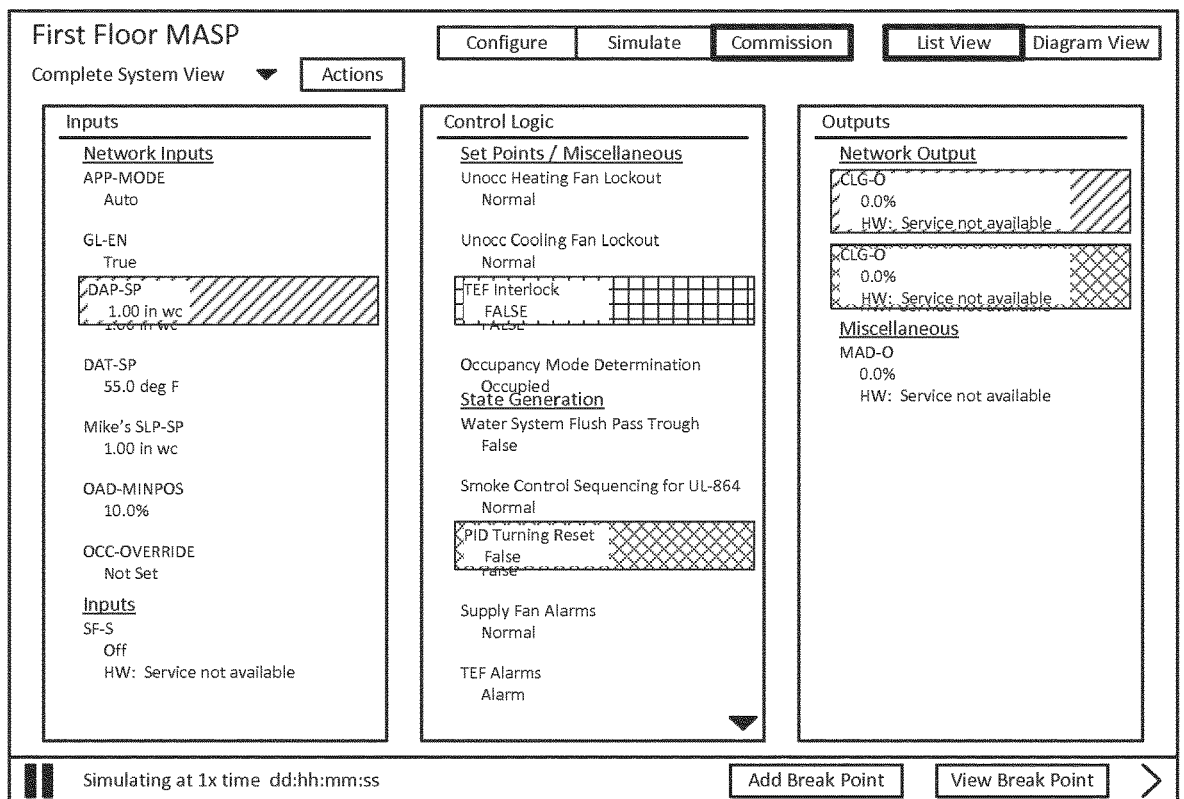
FIG. 10

SYSTEMS AND METHODS FOR VISUALLY INDICATING VALUE CHANGES IN A BUILDING MANAGEMENT SYSTEM

BACKGROUND

The present disclosure relates generally to building management systems. The present disclosure relates more particularly to systems and methods for presenting data, and changes to data, associated with a building management systems (BMS).

A building management system (BMS) is, in general, a system of devices configured to control, monitor, and manage equipment in or around a building or building area. A BMS can include a heating, ventilation, and air conditioning (HVAC) system, a security system, a lighting system, a fire alerting system, another system that is capable of managing building functions or devices, or any combination thereof. BMS devices may be installed in any environment (e.g., an indoor area or an outdoor area) and the environment may include any number of buildings, spaces, zones, rooms, or areas. A BMS may include a variety of devices (e.g., HVAC devices, controllers, chillers, fans, sensors, etc.) configured to facilitate monitoring and controlling the building space. Throughout this disclosure, such devices are referred to as BMS devices or building equipment.

Currently, many building management systems provide control of an entire facility, building, or other environment. The building management system may control HVAC systems, water system, lights, air quality, security, and/or any other aspect of the facility within the purview of the building management system. These systems may require skilled persons to adjust, control, and otherwise operate the building management system, due to the complexity. In large facilities or buildings, this management can be labor intensive. Moreover, in buildings where dynamic management of the building management system is required (i.e. buildings with multiple independent HVAC requirements), advanced planning may be required along with constant adjustment of individual systems within the building management system to adjust for the dynamic use of the building or facility. Further, users or occupants of the facility may have difficulty adjusting certain parameters such as temperature, lighting, window coverings, etc., due to the complex nature of the system. Thus, it would be advantageous to have a control system that can allow for easy control of the system using basic voice or natural language commands, as well as automatically adjust to dynamic use of a facility by monitoring multiple information pathways and extracting contextual information therefrom.

In modern BMS systems a large number of data points are generated. These data points may be associated with controllers, individual devices, sub-systems, configuration tools, etc. Due to the large number of data points and their interconnectivity across the BMS, it can be difficult for a user to efficiently or effectively understand how the data is changing in the system. This can increase times to commission systems as substantial time may be required to verify the interactions between devices and to address initial issues that may arise. Further, in existing systems, maintenance or facilities engineering departments may be required to monitor data associated with a given BMS. Currently, this monitoring is often labor intensive as it is difficult to determine what data points are changing, and any relationships between a change in one data point and a further data point.

Thus, systems and methods for providing a user with insights into data changes in a BMS system would be desirous.

SUMMARY

One implementation of the present disclosure is a building management system monitoring device including a processing circuit. The processing circuit includes a processor and a memory, and is configured to receive data from the building management system. A data evaluation module is stored in the memory and is configured to evaluate the received data. The monitoring device further including a user interface. The user interface is in communication with the processing circuit, and is configured to display real-time data values received by the processing circuit. The user interface is further configured to display a visual indication in response to the data evaluation module determining a data value variation exceeds a predetermined threshold.

In some embodiments, the user interface is a mobile device.

In some embodiments, the visual indication is a colored transparent digital object positioned over each displayed data value.

In some embodiments, an intensity of the colored transparent digital object fades over a defined time period.

In some embodiments, the processing circuit is configured to instruct the user interface to display a primary indication when at least one of the displayed real-time data values is determined to exceed the predetermined threshold.

In some embodiments, the processing circuit is configured to instruct the user interface to display a secondary indication when at least one of the displayed real-time data values is determined to exceed the predetermined threshold a second time within a first predetermined time of the primary indication being displayed.

In some embodiments, the processing circuit is configured to instruct the user interface to display a tertiary indication when at least one of the displayed data values is determined to exceed the predetermined threshold a third time within a second predetermined time of the secondary indication being displayed.

In some embodiments, the predetermined threshold is automatically determined by the processing circuit.

In some embodiments, the processing circuit is further configured to display a number of historical received data values simultaneously with the displayed real-time data values.

A further implementation of the present disclosure is a method of providing a visual indication on a user interface indicating a change in a building management system (BMS) data point. The method include monitoring a plurality of data points of the BMS using a monitoring device. The method further include detecting a value change of one or more of the data points. The method also includes determining if the value change exceeds a predetermined threshold. The method further include displaying a primary indication to a user on the user interface indicating the value change of the changed data points in response to the value change exceeding the predetermined threshold.

In some embodiments, the method further includes detecting a second value change of the changed data points within a first predetermined amount of time, determining if the second value change exceeds the predetermined threshold, and displaying a secondary indication to the user on the user interface indicating the value change of the second value changed data points in response to the second value change exceeding the predetermined threshold.

In some embodiments, the method further includes detecting a third value change of the second value changed within a second predetermined amount of time after the secondary visual indication is displayed, determining if the third value change exceeds the predetermined threshold, and displaying a tertiary indication to the user on the user interface indicating the value change of the changed data points in response to the third value change exceeding the predetermined threshold.

In some embodiments, the method further includes primary visual indication being a first colored transparent digital object, the secondary visual indication being a second colored transparent digital object, and the tertiary visual indication being a third colored transparent digital object.

In some embodiments, the method further includes the primary visual indication, the secondary visual indication, and the tertiary visual indication are displayed separately.

In some embodiment, the method further includes the predetermined threshold being a predefined percentage variation of the data value.

In some embodiments, the method further includes displaying the number of data points in real time on the user interface.

In some embodiments, the method further includes storing the displayed number of data points for a defined period of time.

A further implementation of the present disclosure is a building management system (BMS) monitoring system. The system includes a monitoring tool configured to communicate with the BMS. The monitoring tool includes a processing circuit including a processor and a memory. The processing circuit is configured to receive data from the building management system. The monitoring tool further includes a data evaluation module stored in the memory. The data evaluation module is configured to evaluate the received data. The system further includes a user interface. The user interface is in communication with the monitoring tool. The user interface is configured to display a number of real-time data values received by the processing circuit. The user interface is further configured to perform the step of displaying a primary visual indication in response to the data evaluation module determining a data value variation exceeds a predetermined threshold. The user interface is further configured to perform the step of displaying a secondary visual indication in response to the data evaluation module determining the data value variation exceeds the predetermined threshold within a first predetermined time after the secondary visual indication is displayed. The user interface is further configured to perform the step of displaying a tertiary visual indication in response to the data evaluation module determining the data value variation exceeds the predetermined threshold within a second predetermined time after the secondary visual indication is displayed.

In some embodiments, the user interface of the system communicates with the monitoring tool via a wireless interface.

In some embodiments, the primary visual indication is a first colored transparent digital object, the secondary visual indication is a second colored transparent digital object and the tertiary visual indication is a third colored transparent digital object.

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

BRIEF DESCRIPTION OF THE DRAWINGS

FIG. 7 is a screenshot illustrating the interface of FIG. 5B, showing a second data value change, according to some embodiments.

FIG. 8 is a screenshot illustrating the interface of FIG. 5B, showing a third data value change, according to some embodiments.

FIG. 10 is a screenshot illustrating a historical comparison user interface.

DETAILED DESCRIPTION

Building Management System and HVAC System

Figure 1:
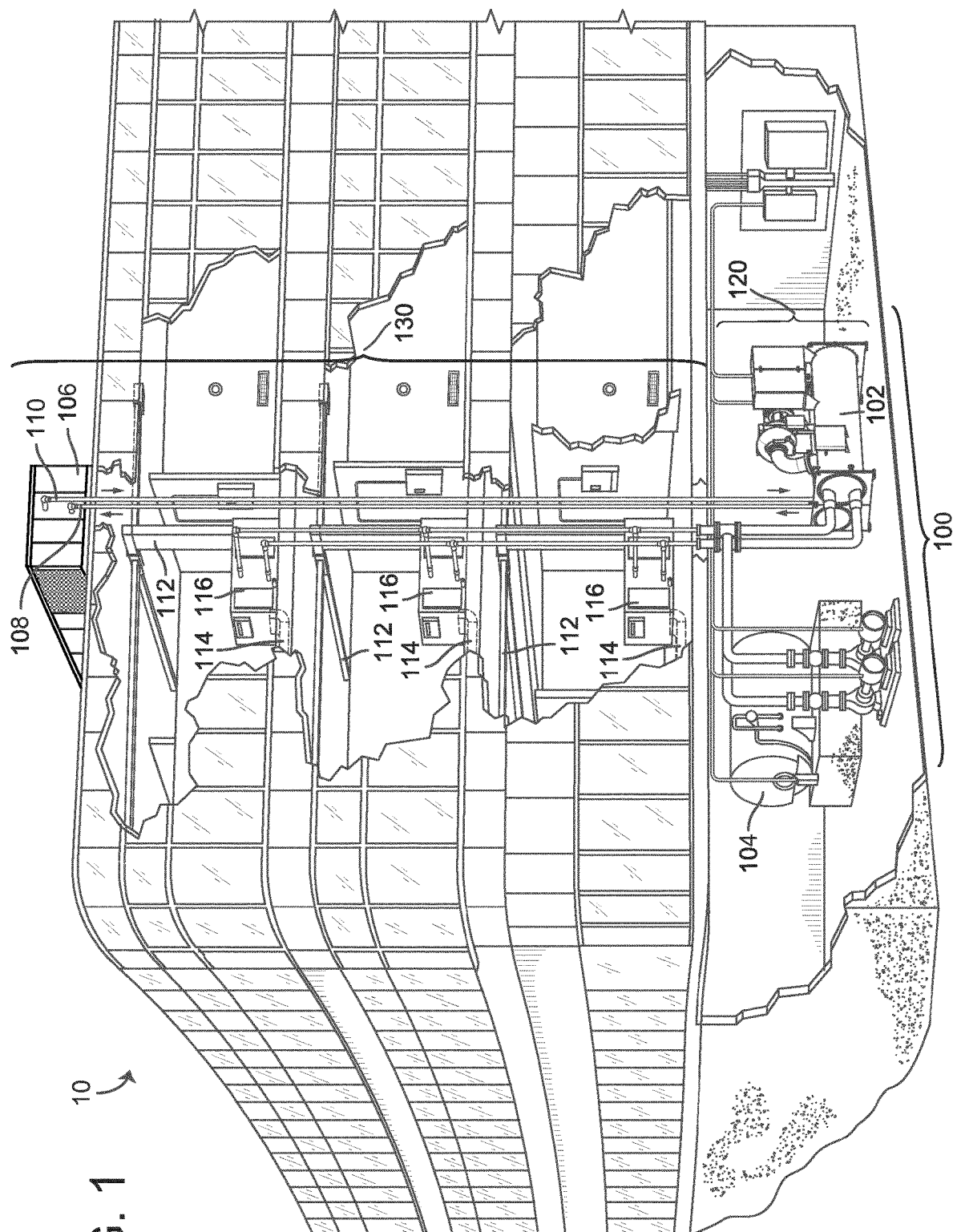
FIG. 1 is a drawing of a building equipped with a building management system (BMS) and a HVAC system, according to some embodiments.

Referring now to FIGS. 1-4, an exemplary building management system (BMS) and HVAC system in which the systems and methods of the present disclosure can be implemented are shown, according to an exemplary embodiment. Referring particularly to FIG. 1, a perspective view of a building 10 is shown. Building 10 is served by a BMS. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

The BMS that serves building 10 includes an HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 can provide a heated or chilled fluid to an air handling unit of airside system 130. Airside system 130 can use the heated or chilled fluid to heat or cool an airflow provided to building 10. An exemplary waterside system and airside system which can be used in HVAC system 100 are described in greater detail with reference to FIGS. 2-3.

HVAC system 100 is shown to include a chiller 102, a boiler 104, and a rooftop air handling unit (AHU) 106. Waterside system 120 can use boiler 104 and chiller 102 to heat or cool a working fluid (e.g., water, glycol, etc.) and can circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 can add heat to the circulated fluid, for example, by burning a combustible material (e.g., natural gas) or using an electric heating element. Chiller 102 can place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 can place the working fluid in a heat exchange relationship with an airflow passing through AHU 106 (e.g., via one or more stages of cooling coils and/or heating coils). The airflow can be, for example, outside air, return air from within building 10, or a combination of Agenth. AHU 106 can transfer heat between the airflow and the working fluid to provide heating or cooling for the airflow. For example, AHU 106 can include one or more fans or blowers configured to pass the airflow over or through a heat exchanger containing the working fluid. The working fluid can then return to chiller 102 or boiler 104 via piping 110.

Airside system 130 can deliver the airflow supplied by AHU 106 (i.e., the supply airflow) to building 10 via air supply ducts 112 and can provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 can receive input from sensors located within AHU 106 and/or within the building zone and can adjust the flow rate, temperature, or other attributes of the supply airflow through AHU 106 to achieve set-point conditions for the building zone.

Figure 2:
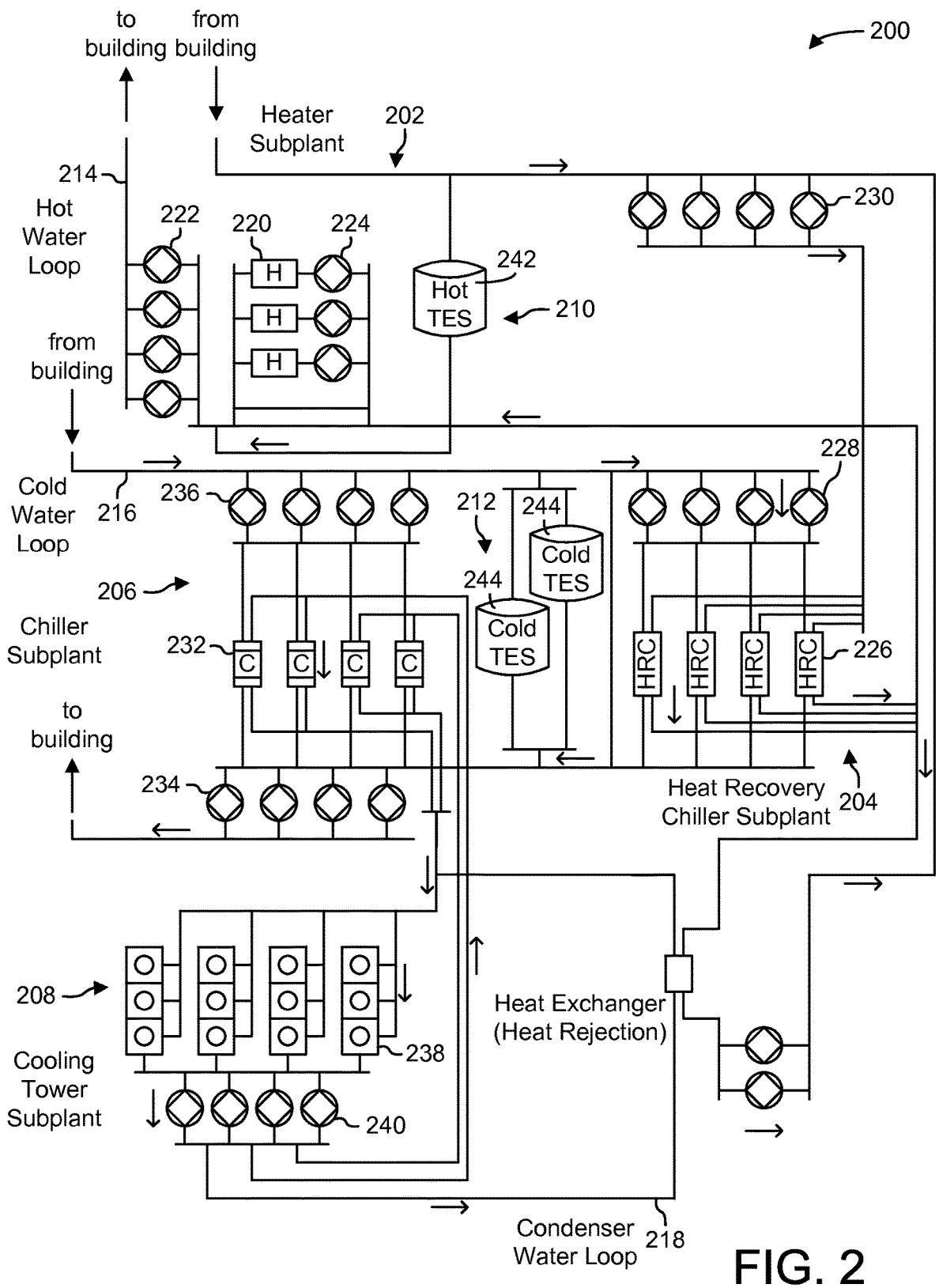
FIG. 2 is a schematic of a waterside system which can be used as part of the HVAC system of FIG. 1, according to some embodiments.

Referring now to FIG. 2, a block diagram of a waterside system 200 is shown, according to an exemplary embodiment. In various embodiments, waterside system 200 can supplement or replace waterside system 120 in HVAC system 100 or can be implemented separate from HVAC system 100. When implemented in HVAC system 100, waterside system 200 can include a subset of the HVAC devices in HVAC system 100 (e.g., boiler 104, chiller 102, pumps, valves, etc.) and can operate to supply a heated or chilled fluid to AHU 106. The HVAC devices of waterside system 200 can be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve the thermal energy loads (e.g., hot water, cold water, heating, cooling, etc.) of a building or campus. For example, heater subplant 202 can be configured to heat water in a hot water loop 214 that circulates the hot water between heater subplant 202 and building 10. Chiller subplant 206 can be configured to chill water in a cold water loop 216 that circulates the cold water between chiller subplant 206 building 10. Heat recovery chiller subplant 204 can be configured to transfer heat from cold water loop 216 to hot water loop 214 to provide additional heating for the hot water and additional cooling for the cold water. Condenser water loop 218 can absorb heat from the cold water in chiller subplant 206 and reject the absorbed heat in cooling tower subplant 208 or transfer the absorbed heat to hot water loop 214. Hot TES subplant 210 and cold TES subplant 212 can store hot and cold thermal energy, respectively, for subsequent use.

Hot water loop 214 and cold water loop 216 can deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve the thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, CO2, etc.) can be used in place of or in addition to water to serve the thermal energy loads. In other embodiments, subplants 202-212 can provide heating and/or cooling directly to the building or campus without requiring an intermediate heat transfer fluid. These and other variations to waterside system 200 are within the teachings of the present invention.

Each of subplants 202-212 can include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 can also include one or more pumps or valves configured to control the flow rate of the hot water into or out of hot TES tank 242. Cold TES subplant 212 is shown to include cold TES tanks 244 configured to store the cold water for later use. Cold TES subplant 212 can also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves can be integrated with the pumps or positioned upstream or downstream of the pumps to control the fluid flows in waterside system 200. In various embodiments, waterside system 200 can include more, fewer, or different types of devices and/or subplants based on the particular configuration of waterside system 200 and the types of loads served by waterside system 200.

Figure 3:
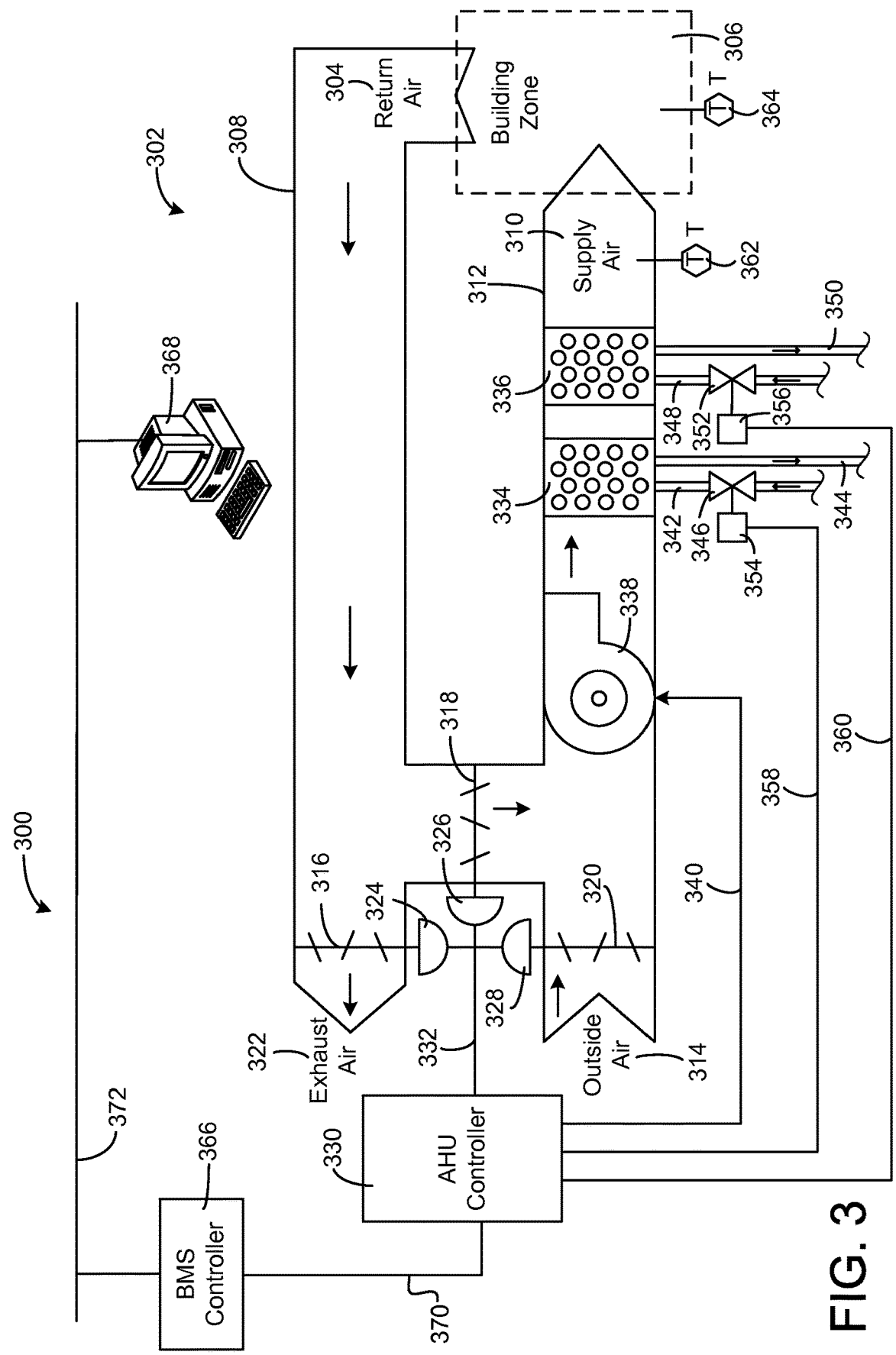
FIG. 3 is a block diagram of an airside system which can be used as part of the HVAC system of FIG. 1, according to some embodiments.

Referring now to FIG. 3, a block diagram of an airside system 300 is shown, according to an exemplary embodiment. In various embodiments, airside system 300 can supplement or replace airside system 130 in HVAC system 100 or can be implemented separate from HVAC system 100. When implemented in HVAC system 100, airside system 300 can include a subset of the HVAC devices in HVAC system 100 (e.g., AHU 106, VAV units 116, ducts 112-114, fans, dampers, etc.) and can be located in or around building 10. Airside system 300 can operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 can receive return air 304 from building zone 306 via return air duct 308 and can deliver supply air 310 to building zone 306 via supply air duct 312. In some embodiments, AHU 302 is a rooftop unit located on the roof of building 10 (e.g., AHU 106 as shown in FIG. 1) or otherwise positioned to receive Agenth return air 304 and outside air 314. AHU 302 can be configured to operate exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 can communicate with an AHU controller 330 via a communications link 332. Actuators 324-328 can receive control signals from AHU controller 330 and can provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 can communicate with fan 338 via communications link 340 to control a flow rate of supply air 310. In some embodiments, AHU controller 330 controls an amount of heating or cooling applied to supply air 310 by modulating a speed of fan 338.

Cooling coil 334 can receive a chilled fluid from waterside system 200 (e.g., from cold water loop 216) via piping 342 and can return the chilled fluid to waterside system 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 can receive a heated fluid from waterside system 200 (e.g., from hot water loop 214) via piping 348 and can return the heated fluid to waterside system 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 can communicate with AHU controller 330 via communications links 358-360. Actuators 354-356 can receive control signals from AHU controller 330 and can provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 can also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a set-point temperature for supply air 310 or to maintain the temperature of supply air 310 within a set-point temperature range). The positions of valves 346 and 352 affect the amount of heating or cooling provided to supply air 310 by cooling coil 334 or heating coil 336 and may correlate with the amount of energy consumed to achieve a desired supply air temperature. AHU controller 330 can control the temperature of supply air 310 and/or building zone 306 by activating or deactivating coils 334-336, adjusting a speed of fan 338, or a combination of Agenth.

Still referring to FIG. 3, airside system 300 is shown to include a building management system (BMS) controller 366 and a client device 368. BMS controller 366 can include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 can communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 can be separate (as shown in FIG. 3) or integrated. In an integrated implementation, AHU controller 330 can be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 can provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 can communicate with BMS controller 366 and/or AHU controller 330 via communications link 372.

Figure 4:
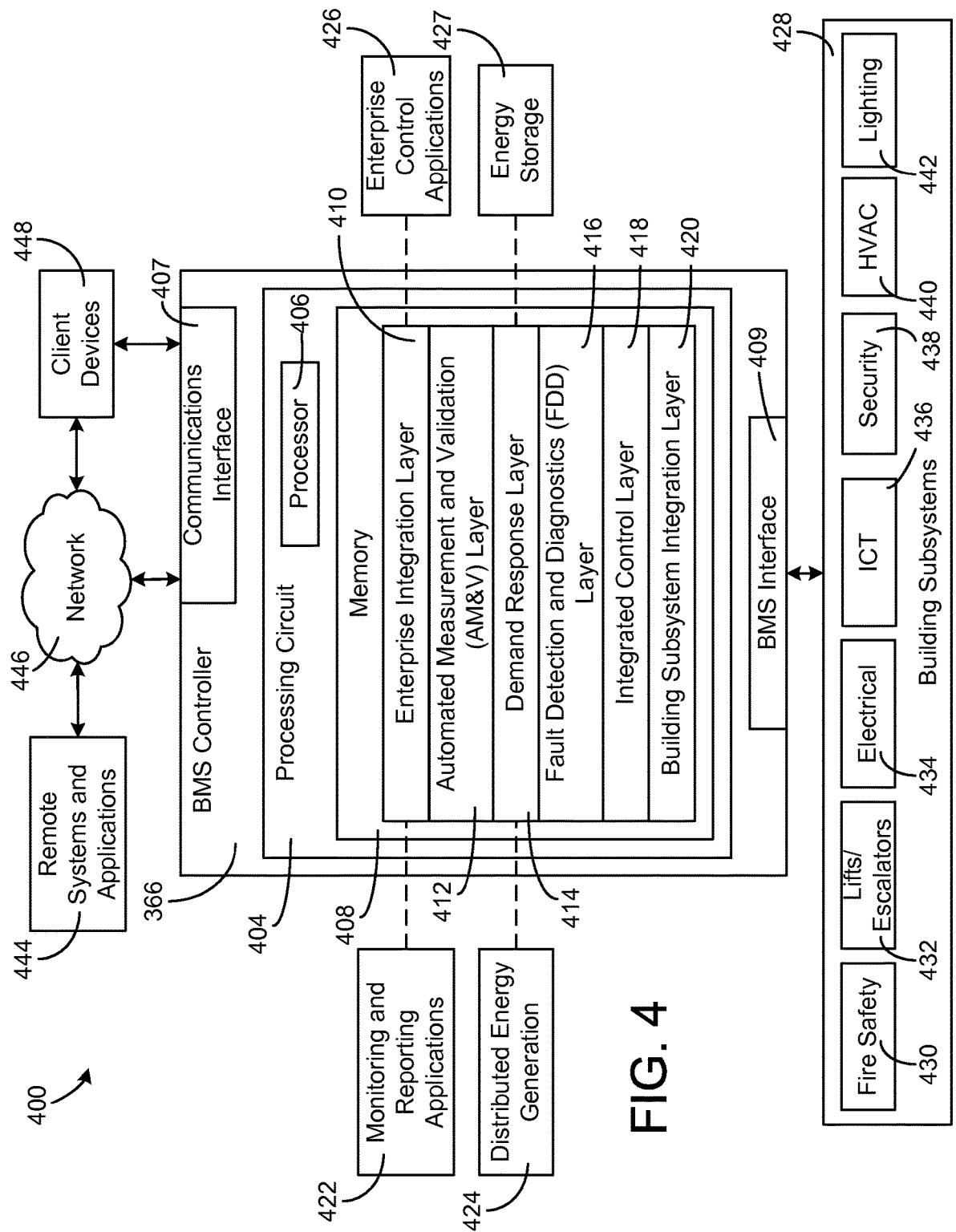
FIG. 4 is a block diagram of a BMS which can be used in the building of FIG. 1, according to some embodiments.

Referring now to FIG. 4, a block diagram of a building management system (BMS) 400 is shown, according to an exemplary embodiment. BMS 400 can be implemented in building 10 to automatically monitor and control various building functions. BMS 400 is shown to include BMS controller 366 and a plurality of building subsystems 428. Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. In various embodiments, building subsystems 428 can include fewer, additional, or alternative subsystems. For example, building subsystems 428 can also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2-3.

Each of building subsystems 428 can include any number of devices, controllers, and connections for completing its individual functions and control activities. HVAC subsystem 440 can include many of the same components as HVAC system 100, as described with reference to FIGS. 1-3. For example, HVAC subsystem 440 can include a chiller, a boiler, any number of air handling units, economizers, field controllers, supervisory controllers, actuators, temperature sensors, and other devices for controlling the temperature, humidity, airflow, or other variable conditions within building 10. Lighting subsystem 442 can include any number of light fixtures, ballasts, lighting sensors, dimmers, or other devices configured to controllably adjust the amount of light provided to a building space. Security subsystem 438 can include occupancy sensors, video surveillance cameras, digital video recorders, video processing servers, intrusion detection devices, access control devices (e.g., card access, etc.) and servers, or other security-related devices.

Still referring to FIG. 4, BMS controller 366 is shown to include a communications interface 407 and a BMS interface 409. Interface 407 can facilitate communications between BMS controller 366 and external applications (e.g., monitoring and reporting applications 422, enterprise control applications 426, remote systems and applications 444, applications residing on client devices 448, etc.) for allowing user control, monitoring, and adjustment to BMS controller 366 and/or subsystems 428. Interface 407 can also facilitate communications between BMS controller 366 and client devices 448. BMS interface 409 can facilitate communications between BMS controller 366 and building subsystems 428 (e.g., HVAC, lighting security, lifts, power distribution, business, etc.).

Interfaces 407, 409 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 409 can be direct (e.g., local wired or wireless communications) or via a communications network 446 (e.g., a WAN, the Internet, a cellular network, etc.). For example, interfaces 407, 409 can include an Ethernet card and port for sending and receiving data via an Ethernet-based communications link or network. In another example, interfaces 407, 409 can include a Wi-Fi transceiver for communicating via a wireless communications network. In another example, one or Agenth of interfaces 407, 409 can include cellular or mobile phone communications transceivers. In one embodiment, communications interface 407 is a power line communications interface and BMS interface 409 is an Ethernet interface. In other embodiments, Agenth communications interface 407 and BMS interface 409 are Ethernet interfaces or are the same Ethernet interface.

Still referring to FIG. 4, BMS controller 366 is shown to include a processing circuit 404 including a processor 406 and memory 408. Processing circuit 404 can be communicably connected to BMS interface 409 and/or communications interface 407 such that processing circuit 404 and the various components thereof can send and receive data via interfaces 407, 409. Processor 406 can be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 408 can be or include volatile memory or non-volatile memory. Memory 408 can include database components, object code components, script components, or any other type of information structure for supporting the various activities and information structures described in the present application. According to an exemplary embodiment, memory 408 is communicably connected to processor 406 via processing circuit 404 and includes computer code for executing (e.g., by processing circuit 404 and/or processor 406) one or more processes described herein.

In some embodiments, BMS controller 366 is implemented within a single computer (e.g., one server, one housing, etc.). In various other embodiments BMS controller 366 can be distributed across multiple servers or computers (e.g., that can exist in distributed locations). Further, while FIG. 4 shows applications 422 and 426 as existing outside of BMS controller 366, in some embodiments, applications 422 and 426 can be hosted within BMS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 can be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BMS 400.

Enterprise integration layer 410 can be configured to serve clients or local applications with information and services to support a variety of enterprise-level applications. For example, enterprise control applications 426 can be configured to provide subsystem-spanning control to a graphical user interface (GUI) or to any number of enterprise-level business applications (e.g., accounting systems, user identification systems, etc.). Enterprise control applications 426 can also or alternatively be configured to provide configuration GUIs for configuring BMS controller 366. In yet other embodiments, enterprise control applications 426 can work with layers 410-420 to optimize building performance (e.g., efficiency, energy use, comfort, or safety) based on inputs received at interface 407 and/or BMS interface 409.

Building subsystem integration layer 420 can be configured to manage communications between BMS controller 366 and building subsystems 428. For example, building subsystem integration layer 420 can receive sensor data and input signals from building subsystems 428 and provide output data and control signals to building subsystems 428. Building subsystem integration layer 420 can also be configured to manage communications between building subsystems 428. Building subsystem integration layer 420 translate communications (e.g., sensor data, input signals, output signals, etc.) across a plurality of multi-vendor/multi-protocol systems.

Demand response layer 414 can be configured to optimize resource usage (e.g., electricity use, natural gas use, water use, etc.) and/or the monetary cost of such resource usage in response to satisfy the demand of building 10. The optimization can be based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 can receive inputs from other layers of BMS controller 366 (e.g., building subsystem integration layer 420, integrated control layer 418, etc.). The inputs received from other layers can include environmental or sensor inputs such as temperature, carbon dioxide levels, relative humidity levels, air quality sensor outputs, occupancy sensor outputs, room schedules, and the like. The inputs can also include inputs such as electrical use (e.g., expressed in kWh), thermal load measurements, pricing information, projected pricing, smoothed pricing, curtailment signals from utilities, and the like.

According to an exemplary embodiment, demand response layer 414 includes control logic for responding to the data and signals it receives. These responses can include communicating with the control algorithms in integrated control layer 418, changing control strategies, changing setpoints, or activating/deactivating building equipment or subsystems in a controlled manner. Demand response layer 414 can also include control logic configured to determine when to utilize stored energy. For example, demand response layer 414 can determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models can include, for example, thermodynamic models describing the inputs, outputs, and/or functions performed by various sets of building equipment. Equipment models can represent collections of building equipment (e.g., subplants, chiller arrays, etc.) or individual devices (e.g., individual chillers, heaters, pumps, etc.).

Demand response layer 414 can further include or draw upon one or more demand response policy definitions (e.g., databases, XML files, etc.). The policy definitions can be edited or adjusted by a user (e.g., via a graphical user interface) so that the control actions initiated in response to demand inputs can be tailored for the user's application, desired comfort level, particular building equipment, or based on other concerns. For example, the demand response policy definitions can specify which equipment can be turned on or off in response to particular demand inputs, how long a system or piece of equipment should be turned off, what setpoints can be changed, what the allowable set point adjustment range is, how long to hold a high demand set-point before returning to a normally scheduled set-point, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 can be configured to use the data input or output of building subsystem integration layer 420 and/or demand response later 414 to make control decisions. Due to the subsystem integration provided by building subsystem integration layer 420, integrated control layer 418 can integrate control activities of the subsystems 428 such that the subsystems 428 behave as a single integrated supersystem. In an exemplary embodiment, integrated control layer 418 includes control logic that uses inputs and outputs from a plurality of building subsystems to provide greater comfort and energy savings relative to the comfort and energy savings that separate subsystems could provide alone. For example, integrated control layer 418 can be configured to use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 can be configured to enhance the effectiveness of demand response layer 414 by enabling building subsystems 428 and their respective control loops to be controlled in coordination with demand response layer 414. This configuration may advantageously reduce disruptive demand response behavior relative to conventional systems. For example, integrated control layer 418 can be configured to assure that a demand response-driven upward adjustment to the set-point for chilled water temperature (or another component that directly or indirectly affects temperature) does not result in an increase in fan energy (or other energy used to cool a space) that would result in greater total building energy use than was saved at the chiller.

Integrated control layer 418 can be configured to provide feedback to demand response layer 414 so that demand response layer 414 checks that constraints (e.g., temperature, lighting levels, etc.) are properly maintained even while demanded load shedding is in progress. The constraints can also include set-point or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 can be configured to provide calculated inputs (e.g., aggregations) to these higher levels based on outputs from more than one building subsystem.

Automated measurement and validation (AM&V) layer 412 can be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 can be based on building system energy models and/or equipment models for individual BMS devices or subsystems. For example, AM&V layer 412 can compare a model-predicted output with an actual output from building subsystems 428 to determine an accuracy of the model.

Fault detection and diagnostics (FDD) layer 416 can be configured to provide on-going fault detection for building subsystems 428, building subsystem devices (i.e., building equipment), and control algorithms used by demand response layer 414 and integrated control layer 418. FDD layer 416 can receive data inputs from integrated control layer 418, directly from one or more building subsystems or devices, or from another data source. FDD layer 416 can automatically diagnose and respond to detected faults. The responses to detected or diagnosed faults can include providing an alert message to a user, a maintenance scheduling system, or a control algorithm configured to attempt to repair the fault or to work-around the fault.

FDD layer 416 can be configured to output a specific identification of the faulty component or cause of the fault (e.g., loose damper linkage) using detailed subsystem inputs available at building subsystem integration layer 420. In other exemplary embodiments, FDD layer 416 is configured to provide "fault" events to integrated control layer 418 which executes control strategies and policies in response to the received fault events. According to an exemplary embodiment, FDD layer 416 (or a policy executed by an integrated control engine or business rules engine) can shut-down systems or direct control activities around faulty devices or systems to reduce energy waste, extend equipment life, or assure proper control response.

FDD layer 416 can be configured to store or access a variety of different system data stores (or data points for live data). FDD layer 416 can use some content of the data stores to identify faults at the equipment level (e.g., specific chiller, specific AHU, specific terminal unit, etc.) and other content to identify faults at component or subsystem levels. For example, building subsystems 428 can generate temporal (i.e., time-series) data indicating the performance of BMS 400 and the various components thereof. The data generated by building subsystems 428 can include measured or calculated values that exhibit statistical characteristics and provide information about how the corresponding system or process (e.g., a temperature control process, a flow control process, etc.) is performing in terms of error from its set-point. These processes can be examined by FDD layer 416 to expose when the system begins to degrade in performance and alert a user to repair the fault before it becomes more severe.

User Interface with Value Change Indication

The BMS, as described above, has multiple data points associated with the individual components of the BMS. Example components may include controllers, such as field equipment controllers (FECs), advanced application field equipment controllers (FAC), network control engines (NCEs), input/output modules (IOMs), and variable air volume (VAV) modular assemblies. However, other controller types are contemplated. Further, other devices such as actuators, valves, AHUs, RTUs, thermostats, or any other device associated with the BMS. In some examples, these data points may be monitored using a centralized monitoring tool, such as a controller configuration tool (CCT) from Johnson Controls. However, other monitoring tools are contemplated.

Figure 5A:
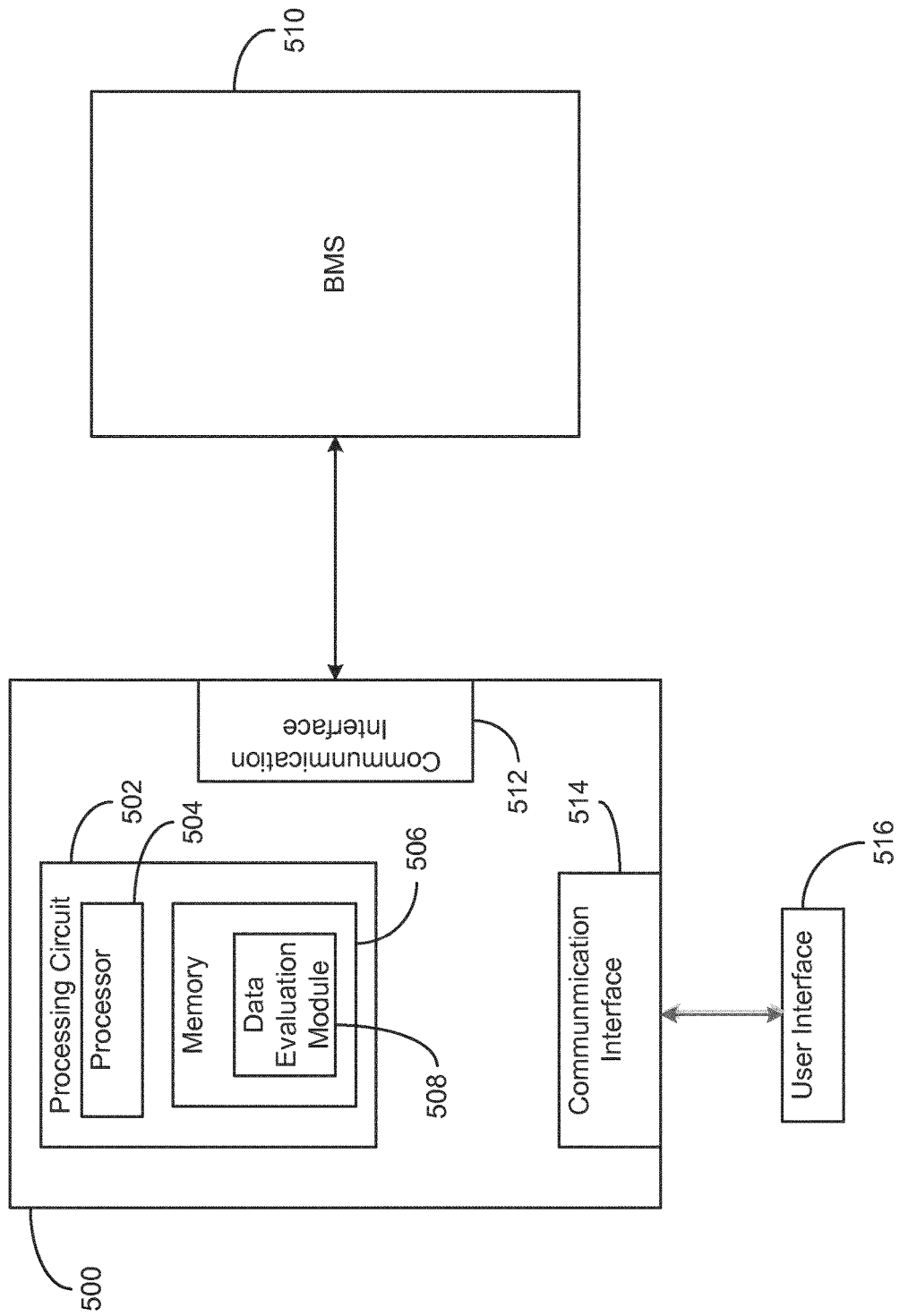
FIG. 5A is a block diagram illustrating a monitoring tool, according to some embodiments.

Referring now to FIG. 5, a block diagram showing a monitoring tool 500 is provided, according to some embodiments. The monitoring tool 500 is shown to include a processing circuit 502. The processing circuit 502 includes a processor 504 and a memory 506. The processor 504 may be a general purpose or specific purpose processor, an application specific integrated circuit (ASIC), one or more field programmable gate arrays (FPGAs), a group of processing components, or other suitable processing components. The processor 504 may be configured to execute computer code or instructions stored in the memory 506 or received from other computer readable media (e.g., CDROM, network storage, a remote server, etc.).

The memory 506 may include one or more devices (e.g., memory units, memory devices, storage devices, etc.) for storing data and/or computer code for completing and/or facilitating the various processes described in the present disclosure. The memory 506 may include random access memory (RAM), read-only memory (ROM), hard drive storage, temporary storage, non-volatile memory, flash memory, optical memory, or any other suitable memory for storing software objects and/or computer instructions. The memory 506 may include database components, object code components, script components, or any other type of information structure for supporting the various activities and information structures described in the present disclosure. The memory 506 may be communicably connected to the processor 504 via processing circuit 502 and may include computer code for executing (e.g., by processor 504) one or more processes described herein.

The memory 506 may include a data evaluation module 508. The data evaluation module 508 may evaluate data received from the BMS 510 via the communication interface 512. The data evaluation module 508 may evaluate changes in received data, as described in more detail below. The BMS 510 may be any BMS, as described above in regards to FIGS. 1-4, and may be of varying size and/or complexity. The communication interface 512 may provide a communication link to the BMS 510. The communication interface 512 may be a serial interface, such as RS-232 or RS-485. In some examples, the communication interface 512 may be a wireless interface such as cellular (3G, 4G, CDMA, LTE, etc.), Wi-Fi, Zigbee, Bluetooth, LoRa, etc. In other examples, the communication interface 512 may include other wired interfaces such as USB, Firewire, Lightning Connections, CATS (wired Ethernet), etc.

In one embodiment, the monitoring tool 500 is a web-based tool. For example, the monitoring tool 500 may be hosted on a server, and accessed via a network connection. In some examples, the network connection may be a local network connection such as a local area network (LAN), or a wide area network (WAN). In other examples, the network connection may be an internet based connection, which may allow a user to access the monitoring tool 500 using a web browser, such as an HTML web browser. In other embodiments, the monitoring tool 500 may be hosted on a server and accessed using a thin-client device. In other embodiments, the monitoring tool 500 is loaded onto a thick-client device, such as a laptop, personal computer (PC), or other computing device which can communicate with the BMS.

The monitoring tool may further be in communication with a user interface 514 via a communication interface 516. The communication interface 516 may be a serial interface, such as RS-232 or RS-485. In some examples, the communication interface 516 may be a wireless interface such as cellular (3G, 4G, CDMA, LTE, etc.), Wi-Fi, Zigbee, Bluetooth, LoRa, etc. In other examples, the communication interface 512 may include other wired interfaces such as USB, Firewire, Lightning Connections, CATS (wired Ethernet), etc. In one embodiment, the user interface 514 is integrated into the monitoring tool 500. In other embodiments, the user interface 514 may be an external device which accesses the monitoring tool 500 via the communication interface 516. In one embodiment, the user interface 512 is configured to be a scalable user interface to allow for the user interface 514 to be displayed using multiple devices. This can allow any device with sufficient permissions and a network interface to be able to access the monitoring tool using an applicable browser. For example, mobile devices such as smartphones (iPhone, Android phone, Windows phone, etc.), table computers (iPad, Android tablet, Windows Surface, etc.), mobile computers (laptops, netbooks), stationary computers (PCs), or dedicated devices having an network interface may be used to access the user interface 514. Dedicated devices may include smart thermostats, dedicated BMS controllers, home hubs, or access point devices such as a mobile access point (MAP) device from Johnson Controls.

Figure 5B:
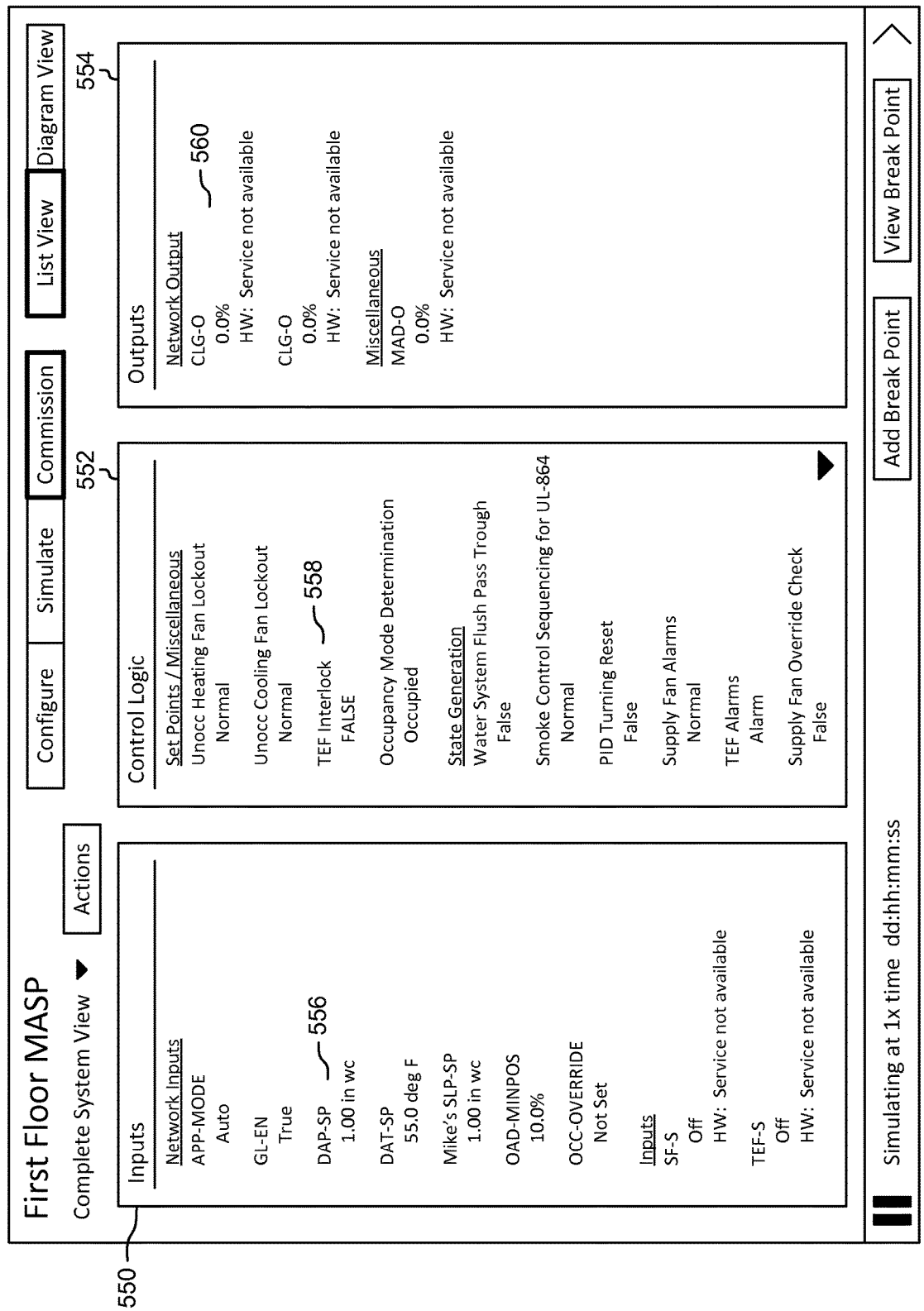
FIG. 5B is a screenshot illustrating a user interface associated with the monitoring tool of FIG. 5A, according to some embodiments.

Referring now to FIG. 5B, a screenshot showing the user interface 514 of the monitoring tool 500 is shown, according to some embodiments. The user interface may have multiple data groups, such as inputs 550, control logic 552, and outputs 508. However, more or fewer data groups may be used, as required for an application. The data groups 550, 552, 554 may include multiple data points associated with multiple devices or systems within the BMS. In some examples, each data point may be associated with an individual device in the BMS. Further, each data value may have a format associated with the data point provided by the associated device. For example, the data points may be formatted as floating integer values, binary values, list values, or other value formats as applicable to the monitoring tool. The data points may further be associated with units of measure. For example, data point 556 expresses values in units of inch water column (in wc), data point 558 expresses data as "true" or "false" (i.e. binary), and data point 560 expresses values in percentages (%). These units of measure are for example purposes only and it is contemplated that the user interface 514 may display data values having various units of measure, as required.

Figure 6:
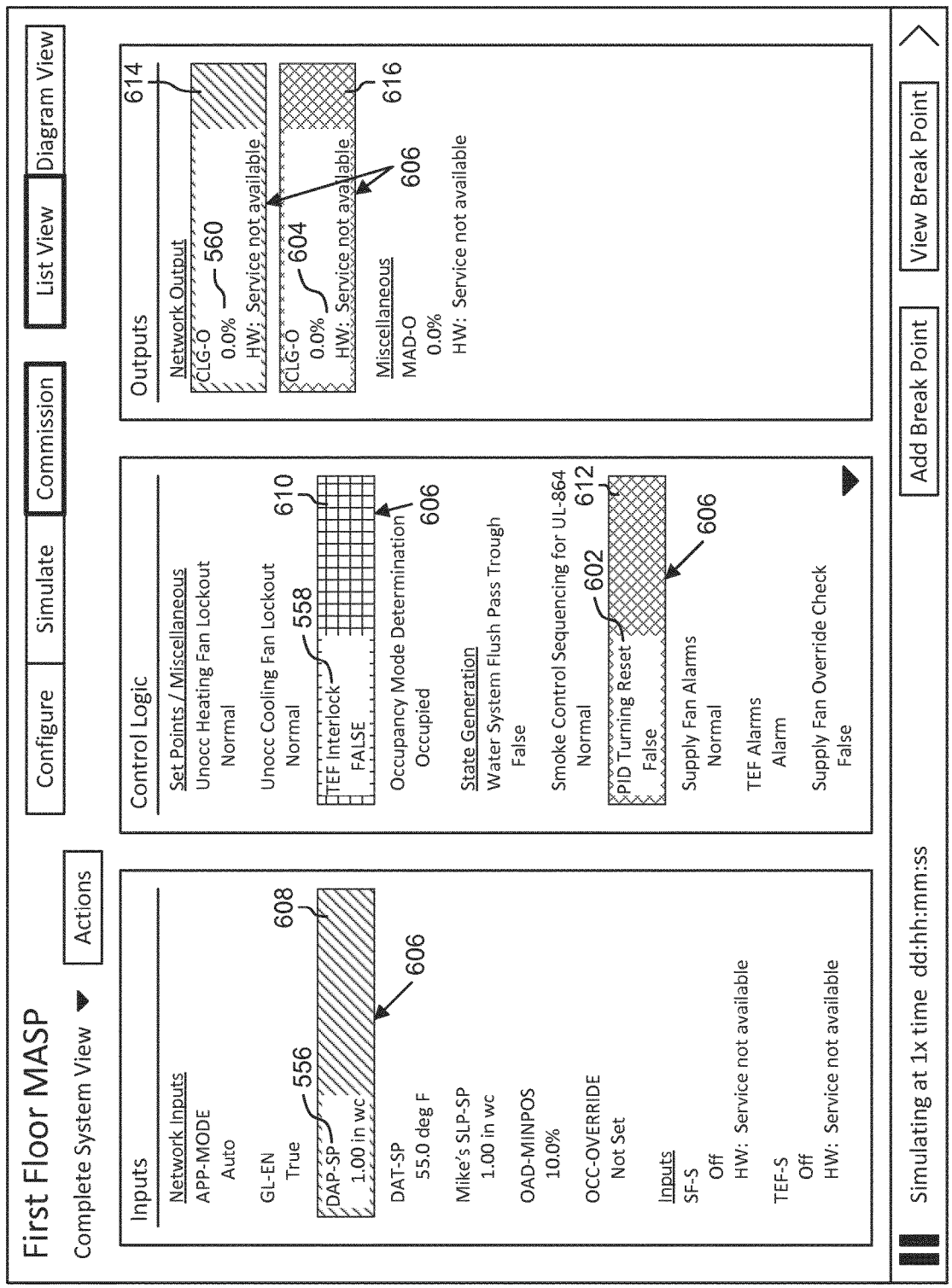
FIG. 6 is a screenshot illustrating the interface of FIG. 5B, showing a first data value change, according to some embodiments.

In some embodiments, each data point shown on the user interface 514 shows a real-time, or near-real time, value associated with a data point in the BMS. During normal operation, these data points may vary. In some instances, the number of data points provided on the user interface can be substantial, thereby making it difficult for a user to observe changes occurring in the system. Accordingly, the monitoring tool 500 may generate an visual indicator on the user interface 514 to provide visual indication to a user that one or more values are changing. Turning now to FIG. 6, the user interface 514 is shown after a value change for data points 556, 558, and 560, as well as data points 602, 604. As shown in FIG. 6, the data points 556, 558, 560, 602, 604, having experienced a value change, may be highlighted to provide a primary indication 606 that a change has occurred. In one embodiment, the primary indicator 606 can be provided by placing a colored, transparent layer over each data value when the value changes, as shown by the indicator layers 608, 610, 612, 614, 616 in FIG. 6. In one embodiment, the transparent layers are digitally created artifacts within the user interface. In some embodiments, a transparent layer may be placed over each data point on the user interface. When no data changes are detected, the transparent layer may be unseen by the user as no color is applied. Upon a value change of a data point, the layer may change color to indicate a value change. In some embodiments, the color used to indicate an initial value change in a data point may be blue. However, other colors are contemplated.

In some embodiments, the primary indication 606 may be configured to fade in intensity over a period of time. In some embodiments, a user can configure the period of time. However, in other embodiments, the period of time may be a default period of time. For example, the period of time may be ten seconds. However, periods of time of less than ten seconds or more than ten seconds are also contemplated. This can be seen in FIG. 6, as the indicator layers 608, 612 and 616 display the primary indication 606 with less intensity than transparent layers 610, 614, indicating that the data changes of data points 556, 602, 604 occurred prior to the value changes of data points 558, 560. This is a useful tool, as it allows a user to determine which data changes occurred first, and which data values subsequently changed. This can provide insights into relationships between various data points in the BMS, which can provide for more efficient commissioning, troubleshooting, and/or maintenance of the BMS.

In some instances, a value of a data point may change again while the indicator layer currently shows a recent value change. To inform the user that a further value change has occurred, the indicator layer may provide a secondary indication 702, such as changing colors to indicate a further value change. For example, as shown in FIG. 7, the indicator layer 614 for data point 560 is providing the secondary indication 702 to a user. In one embodiment, the secondary indication 702 may be a different color than the primary indication 606. For example, the secondary indication 702 may be a yellow color. However, other colors separate from the primary indication 606 are contemplated. In other embodiments, the secondary indication 702 may provide indications other than via a color, such as a flashing of the primary indication 606 color. In some embodiments, the secondary indication 702 may be provided by indication layer 614. However, in other embodiments, a separate indication layer may be provided to replace indication layer 614. Furthermore, the secondary indication 702 provided by indication layer 614 may be configured to fade in intensity over a period of time. In some embodiments, a user can configure the period of time. However, in other embodiments, the period of time may be a default period of time. For example, the period of time may be ten seconds. However, periods of time of less than ten seconds and more than ten seconds are also contemplated.

Turning now to FIG. 8, a tertiary indication 802 may further be provided to inform the user that an additional value change has occurred while the secondary indicator 702 was still active. As shown in FIG. 8, the indicator layer 614 for data point 560 is providing the tertiary indication 802 to a user. In one embodiment, the tertiary indication 802 may be a different color than the primary indication 606 and the secondary indication 702. For example, the tertiary indication 802 may be a red color. However, other colors separate from the primary indication 606 and the secondary indication 702 are contemplated. In other embodiments, the tertiary indication 802 may be indications other than a color, such as a flashing pattern of the primary indication 606 color, or the secondary indication 702 color, in a distinct pattern. In some embodiments, the tertiary indication 802 may be provided by indication layer 614. However, in other embodiments, a separate indication layer may be provided to replace indication layer 614. Furthermore, the tertiary indication 802 provided by indication layer 614 may be configured to fade in intensity over a period of time. In some embodiments, a user can configure the period of time. However, in other embodiments, the period of time may be a default period of time. For example, the period of time may be ten seconds. However, periods of time of less than ten seconds and more than ten seconds are also contemplated.

While the above examples show only primary indications 606, secondary indications 702, and tertiary indications 802, it is contemplated that additional indications may also be provided. In one embodiment, a user may select the number of indications that are presented. For example, a user may configure the monitoring tool 500 to provide up to ten levels of indications. However, the user may configure the monitoring tool 500 to provide more than ten levels of indications or less than ten levels of indications.

Figure 9:
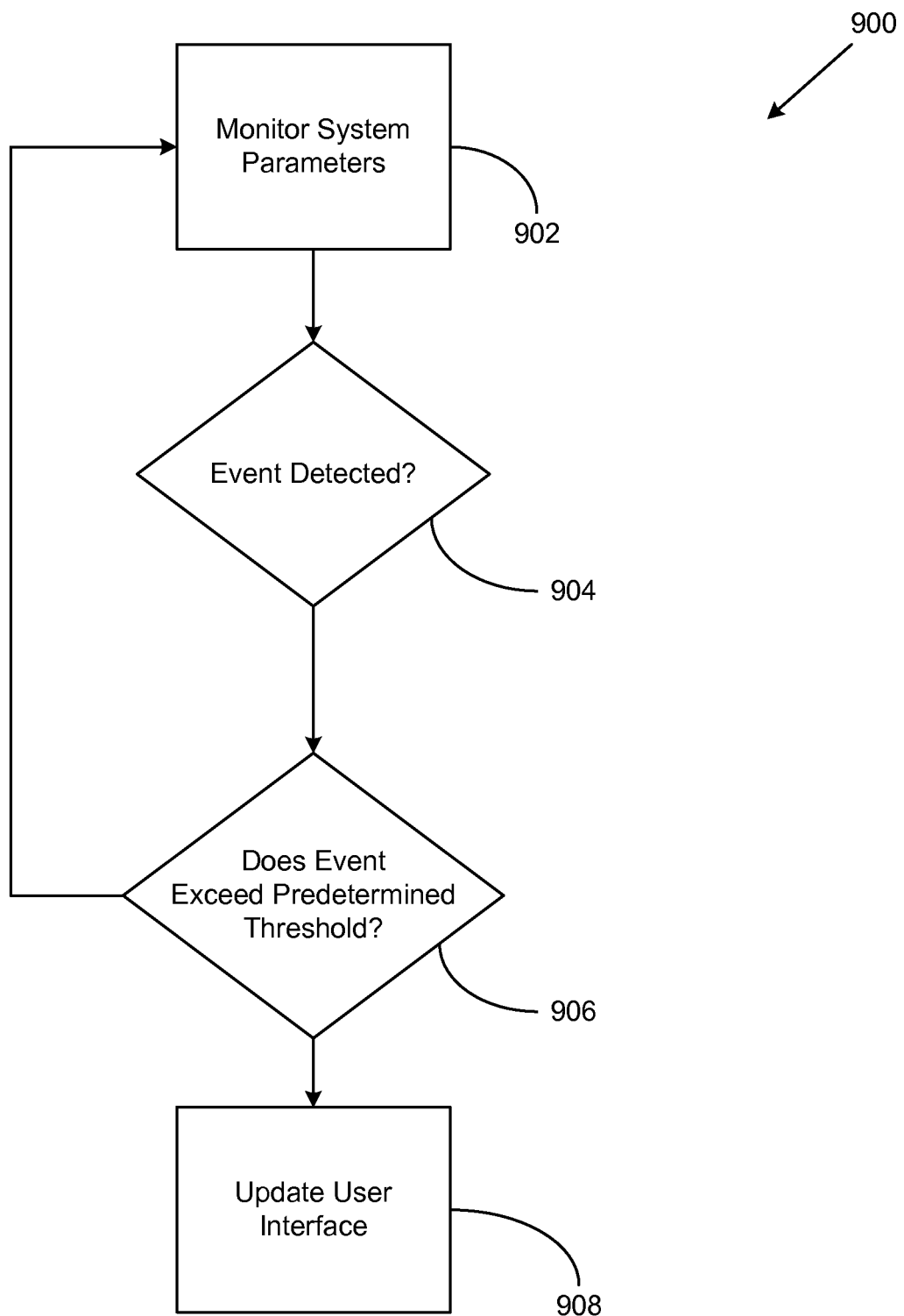
FIG. 9 is a flow chart illustrating a process for updating a user interface with a data value change, according to some embodiments.

Turning now to FIG. 9, a flow chart illustrating a process 900 for providing an indication to a user of an updated data value is shown, according to some embodiments. In some embodiments, the process 900 may be performed by the processing circuit 502 executing the data evaluation module 508. At process block 902, a monitoring tool, such as monitoring tool 500, may monitor data value associated with a system, such as a BMS. In some embodiments, the monitoring tool may receive the data values directly from a central BMS controller. In other embodiments, the monitoring tool may receive the data values from multiple components within the BMS system. In still further embodiments, the monitoring tool may receive the data values via a device coupled to a network of the BMS. For example, a mobile access point (MAP) device may provide the data to the monitoring tool 500. At process block 904, the monitoring tool can determine if an event was detected. An event may be a change in a data value, a user input, etc.

At process block 906, the monitoring tool evaluates the event to determine if the event exceeds a predetermined threshold. In one embodiment, where the event is a value change, the monitoring tool determines if the value change varies by a percentage that exceeds a predetermined value. For example, the monitoring tool may determine if the value change exceeds a predetermined value of ten percent or more. However, predetermined values of more than ten percent or less than ten percent are contemplated. Additionally, the predetermined values may be percentage of variation, discrete value levels not to be exceeded, the change of state of a binary signal, or other predetermined value type. The predetermined values may be set by a user. In some embodiments, the user may set the predetermined threshold values globally for all data points being monitored. In other embodiments, the user may set threshold values for each individual data point. In still further embodiments, the user may set threshold values based on groups of data points, such as via data groups 550, 552, 554. The user may also set the threshold values based on other groups of data such as a unit of measure for the data points. For example, Boolean data values (e.g. true/false) may have a threshold set to provide an indication whenever there is a change of state. In contrast, data values representing measured values, such as inches of water, may allow a user to set a threshold value of a percent of variation (e.g. ten percent). In other examples, data values representing measured values, may allow a user to set a discrete threshold value. For example, for a data value representing a temperature, the user may set the predetermined threshold to be ten-degree increments, such that the threshold is reached every time the temperature changes by more than ten degrees.

In further embodiments, the threshold values may be rule based thresholds. For example, the predetermined threshold may only be triggered if a given values varies by a predetermined amount, such as described above, within a given period of time. For example, the predetermined threshold value may require a Boolean data value to change state five times within a time period, such as one minute. Other rule based threshold values may include rules based on times of day when the changes occur, operational modes of the system (e.g. maintenance mode, commissioning mode, normal operation), what specific functions are being performed (e.g. reducing temperature of a room, increasing output flow of a chiller, etc.), or other rule based threshold values, as applicable. In still further embodiments, the predetermined threshold values may be determined by the monitoring tool. For example, the monitoring tool may use advanced statistical analytics to determine threshold values that are appropriate. For example, the monitoring tool analyze prior tending data to determine the usual data point variations in a given system over time. The monitoring tool may then establish threshold values for each data point that would indicate a variation from the normal operational variation of the data point.

If the monitoring tool determines that the event exceeded the predetermined threshold at process block 906, the monitoring tool may update the user interface at process block 908. In one embodiment, the user interface may be updated as described above in regards to FIGS. 6-8. If the event is determined to not exceed the predetermined threshold at process block 906, the monitoring tool can resume monitoring the system data values at process block 902.

Turning now to FIG. 10, a comparison user interface 1000 is shown, according to some embodiments. The comparison user interface 1000 may provide the user with a historical data display 1002 in conjunction with a real time data display 1004. In one embodiment, the historical data display 1002 may display the data values associated with a previous point in time, while the real time data display may display current data values. In one example, the historical data display 1002 may display the data values from 24 hours previous to the current time, thereby allowing a user to see what values are changing today, and compare that to any value changes the day before. However, the historical data may be from other prior time periods, such as 12 hours, 48 hours, etc., and be selectable by a user. As shown in FIG. 10, the historical data display 1002 shows no indications of data changes in the previous time frame, while the real time data shows four data values having a value change sufficient to generate an indication. This can provide a user with additional insights into the system by allowing the user to visually see value changes in the data at one or more points in time.

In some embodiments, a user may record the data changes occurring over a period of time. For example, the user may configure the monitoring device 500 to record the prior thirty minutes of data values at all times. The user may then review the recorded values, using the user interface 514. In some embodiments, the recorded values may be displayed using the historical data display 1002, for comparison against the real time data shown in the real time data display 1004. In other embodiments, historical data, as described above may be provided on the historical data display 1002, and the recorded data may be displayed on the real time data display 1004 to allow a user to observe the recorded value changes and compare them to historical data from the previous day.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A building management system (BMS) comprising:
building equipment that controls a building environment; and
a configuration tool comprising a processor and a memory, the configuration tool configured to receive data values from the building equipment, provide control parameters to the building equipment, and present a user interface to a user of the BMS via a user device;
wherein the user interface displays the data values received from the building equipment and allows the user to modify the control parameters, and wherein a control parameter modification causes a corresponding change in operation of the building equipment, thereby resulting in changes to one or more of the data values affected by operating the building equipment in accordance with the control parameter modification; and
wherein the user interface displays a primary visual indication over a data value in response to detecting that the data value has changed by an amount that exceeds a predetermined threshold within a predetermined time period, wherein the user interface displays a secondary visual indication over a second data value in response to the control parameter modification causing a change in the second data value that exceeds the predetermined threshold and occurs within a predetermined time period after the primary visual indication is displayed, wherein the primary visual indication is a first color, and wherein if the primary visual indication is displayed when the secondary visual indication is initiated, the secondary visual indication is a second color different than the first color, and wherein if the primary visual indication is not displayed, when the secondary visual indication is initiated the secondary visual indication is the first color.

2. The BMS of claim 1, wherein the user device comprises a smartphone, a tablet, a laptop, or a personal computer.

3. The BMS of claim 1, wherein the primary visual indication comprises a colored transparent object positioned over the data value on the user interface.

4. The BMS of claim 3, wherein an intensity of the colored transparent object fades over a second predetermined time period.

5. The BMS of claim 1, wherein the building equipment comprises at least one of an air handling unit (AHU), a chiller, a boiler, and a variable air volume (VAV) unit.

6. The BMS of claim 1, wherein the user interface displays the secondary visual indication comprises a graphic with text.

7. The BMS of claim 6, wherein the user interface displays a tertiary visual indication over a third data value in response to the control parameter modification causing a change in the third data value that exceeds the predetermined threshold within a predetermined time period after the secondary visual indication is displayed.

8. The BMS of claim 1, wherein the control parameter modification comprises a change of a temperature setpoint, a pressure setpoint, a speed setpoint, a flow setpoint, or a valve position associated with the building equipment.

9. The BMS of claim 1, wherein the data value comprises a measurement of temperature, pressure, flow, speed, or position.

10. The BMS of claim 1, wherein the predetermined threshold comprises a percentage.

11. The BMS of claim 1, wherein the primary visual indication comprises a colored transparent object positioned over the data value on the user interface having the first color, and wherein the secondary visual indication comprises a second colored transparent object positioned over the second data value on the user interface, wherein a color of the second colored transparent object depends on the primary visual indication.

12. A method for simplifying configuration of a building management system (BMS), the method comprising:
receiving data values from building equipment that controls a building environment;
providing a user interface to a user of the BMS via a user device that displays the data values from the building equipment and allows the user to modify control parameters associated with the building equipment, wherein a control parameter modification causes a corresponding change in operation of the building equipment, thereby resulting in changes to one or more of the data values affected by operating the building equipment in accordance with the control parameter modification;
displaying a primary visual indication on the user interface and over a data value in response to detecting that the data value has changed by an amount that exceeds a predetermined threshold within a predetermined time period after executing the control parameter modification;
detecting a change in a second data value that occurs within a first predetermined amount of time after the primary visual indication is displayed;
determining if the change in the second data value exceeds the predetermined threshold; and
displaying a secondary visual indication on the user interface and over the second data value in response to a determination that the change in the second data value exceeds the predetermined threshold, wherein the primary visual indication is a first color, and wherein if the primary visual indication is displayed when the secondary visual indication is initiated the secondary visual indication is a second color different than the first color, and wherein if the primary visual indication is not displayed when the secondary visual indication is initiated the secondary visual indication is the first color.

13. The method of claim 12,
wherein the primary visual indication is the first color, and wherein if the primary visual indication is displayed when the secondary visual indication is initiated the secondary visual indication is the second color different than the first color, and wherein if the primary visual indication is not displayed when the secondary visual indication is initiated the secondary visual indication is the first color.

14. The method of claim 12, further comprising:
detecting a change in a third data value that occurs within a second predetermined amount of time after the secondary visual indication is displayed;
determining if the change in the third data value exceeds the predetermined threshold; and
displaying a tertiary visual indication on the user interface and over the third data value in response to a determination that the change in the third data value exceeds the predetermined threshold.

15. The method of claim 14, wherein the primary visual indication comprises a first colored transparent object, the secondary visual indication comprises a second colored transparent object, and the tertiary visual indication comprises a third colored transparent object.

16. The method of claim 14, wherein the primary visual indication, the secondary visual indication, and the tertiary visual indication are displayed separately.

17. The method of claim 12, wherein the predetermined threshold comprises a percentage.

18. The method of claim 12, wherein the control parameter modification comprises a change of a temperature setpoint, a pressure setpoint, a speed setpoint, a flow setpoint, or a valve position associated with the building equipment.

19. A method for simplifying configuration of a building management system (BMS), the method comprising:
receiving data values from building equipment that controls a building environment;
providing a user interface to a user of the BMS via a user device that displays the data values from the building equipment and allows the user to modify control parameters associated with the building equipment, wherein a control parameter modification causes a corresponding change in operation of the building equipment, thereby resulting in changes to one or more of the data values affected by operating the building equipment in accordance with the control parameter modification;
displaying a primary visual indication on the user interface and over a data value in response to detecting that the data value has changed by an amount that exceeds a predetermined threshold within a predetermined time period after executing the control parameter modification;

detecting a change in a second data value that occurs within a first predetermined amount of time after the primary visual indication is displayed;

determining if the change in the second data value exceeds the predetermined threshold; and displaying a secondary visual indication on the user interface and over the second data value in response to a determination that the change in the second data value exceeds the predetermined threshold, wherein the primary visual indication comprises a first colored transparent object and the secondary visual indication comprises a second colored transparent object, the method further comprising:

determining if the primary visual indication is displayed on the user interface;

in response to a determination that the primary visual indication is displayed, a second color of the second colored transparent object is different than a first color of the first colored transparent object; and in response to a determination that the primary visual indication is not displayed, the second color of the second colored transparent object is the same as the first color of the first colored transparent object.

20. The BMS of claim 19, wherein the primary visual indication is the first color, and wherein if the primary visual indication is displayed when the secondary visual indication is initiated the secondary visual indication is the second color different than the first color, and wherein if the primary visual indication is not displayed when the secondary visual indication is initiated the secondary visual indication is the first color.

* * * * *